United States Patent [19]

Gardner

[11] Patent Number: 4,761,105
[45] Date of Patent: Aug. 2, 1988

[54] BLIND FASTENER SETTABLE BY SPRING PIN

[75] Inventor: Robert B. Gardner, Camp Hill, Pa.

[73] Assignee: National Rivet & Manufacturing, Company, Waupun, Wis.

[21] Appl. No.: 521,067

[22] Filed: Aug. 8, 1983

[51] Int. Cl.⁴ .................... F16B 13/06; B23P 11/00
[52] U.S. Cl. ......................... 411/57; 411/501; 29/243.5
[58] Field of Search .............. 411/39, 40, 41, 44, 411/49, 57, 60, 500, 501, 479; 29/243.5

[56] References Cited

U.S. PATENT DOCUMENTS

| | | | |
|---|---|---|---|
| 1,613,921 | 1/1927 | Berge | 411/375 |
| 1,758,907 | 5/1930 | Carr | 411/57 X |
| 1,758,908 | 5/1930 | Carr | 411/57 X |
| 1,810,749 | 6/1931 | Bowler | 411/15 |
| 1,856,508 | 5/1932 | Price | 411/57 X |
| 1,944,513 | 1/1934 | Johnson | 411/57 |
| 2,344,717 | 3/1944 | Mills et al. | 411/15 |
| 2,398,532 | 4/1946 | Keehn | 411/501 X |
| 2,400,142 | 5/1946 | Tinnerman | 411/61 |
| 3,015,140 | 1/1962 | Pender | 411/501 X |
| 3,162,086 | 12/1964 | Wells et al. | 411/44 X |
| 3,430,408 | 3/1969 | Dean | 411/479 X |
| 3,438,302 | 4/1969 | Sandor | 411/57 |

FOREIGN PATENT DOCUMENTS

| | | | |
|---|---|---|---|
| 476213 | 4/1974 | Australia | 411/60 |
| 674659 | 10/1929 | France | 411/500 |
| 2306782 | 11/1976 | France | 411/60 |
| 884123 | 12/1961 | United Kingdom | 411/57 |
| 1161785 | 8/1969 | United Kingdom | 411/45 |
| 642529 | 1/1979 | U.S.S.R. | 411/60 |

Primary Examiner—Gary L. Smith
Assistant Examiner—Rodney M. Lindsey
Attorney, Agent, or Firm—Wheeler Law Firm

[57] ABSTRACT

Blind fastener of the type having a tubular outer member with a head at one end and a conical portion at the other end, the conical portion having its apex within the outer member. The conical portion is expanded radially to form a second head on the fastener for securing it in place. The member selected for expanding the conical portion comprises a spring pin. In some embodiments novel apex contacting means are interposed between the spring pin and the apex of the conical portion. The apex contacting means is either formed integrally with one end of the spring pin or as a separate piece disposed between the spring pin and the apex of the conical portion. One important advantage of using a spring pin as the setting means is that its resilience retains it within the outer member despite vibrations, temperature changes, or other conditions which might tend to dislodge the setting means. Other advantages are lighter weight and greater strength at no more cost than previous solid setting pins.

12 Claims, 4 Drawing Sheets

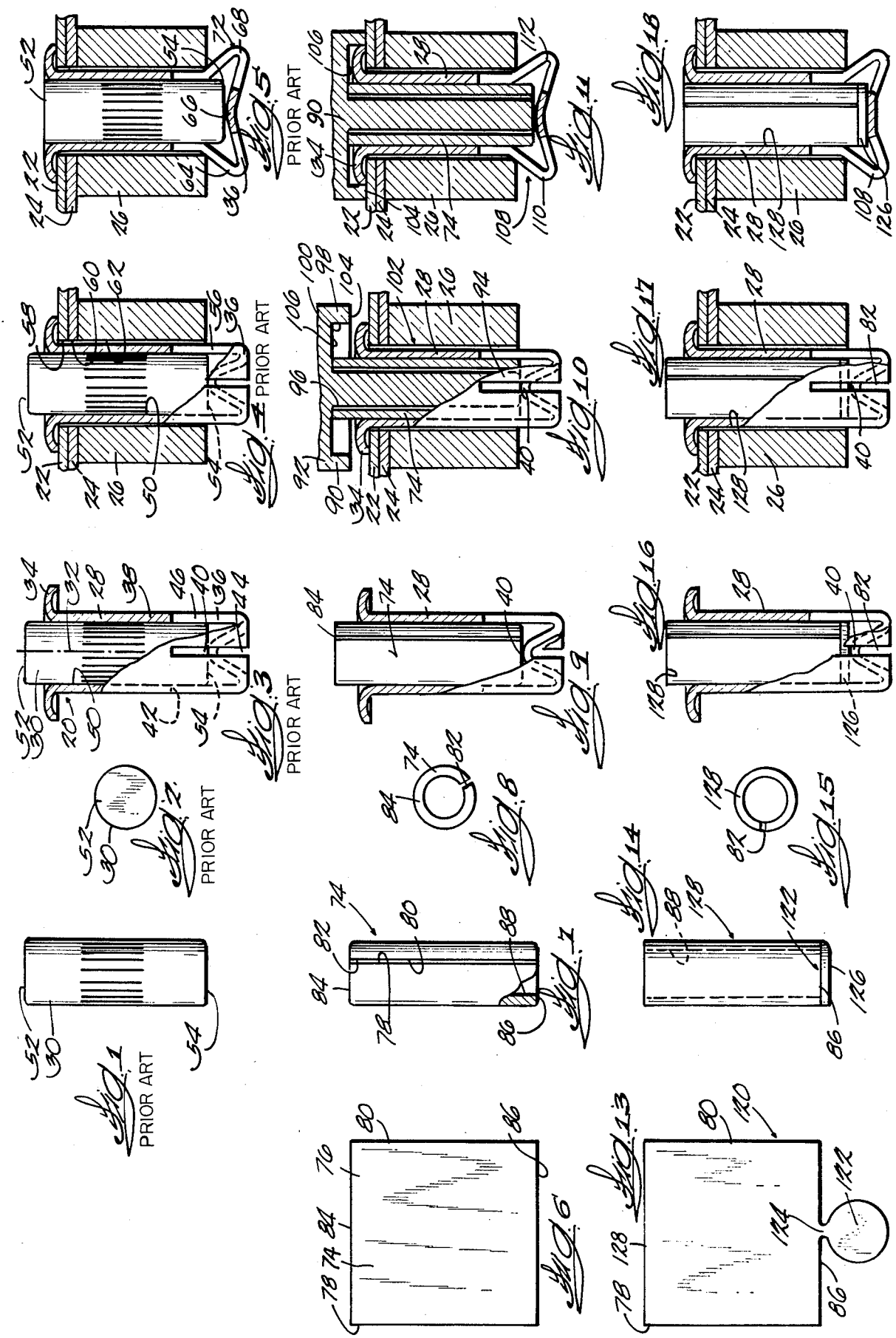

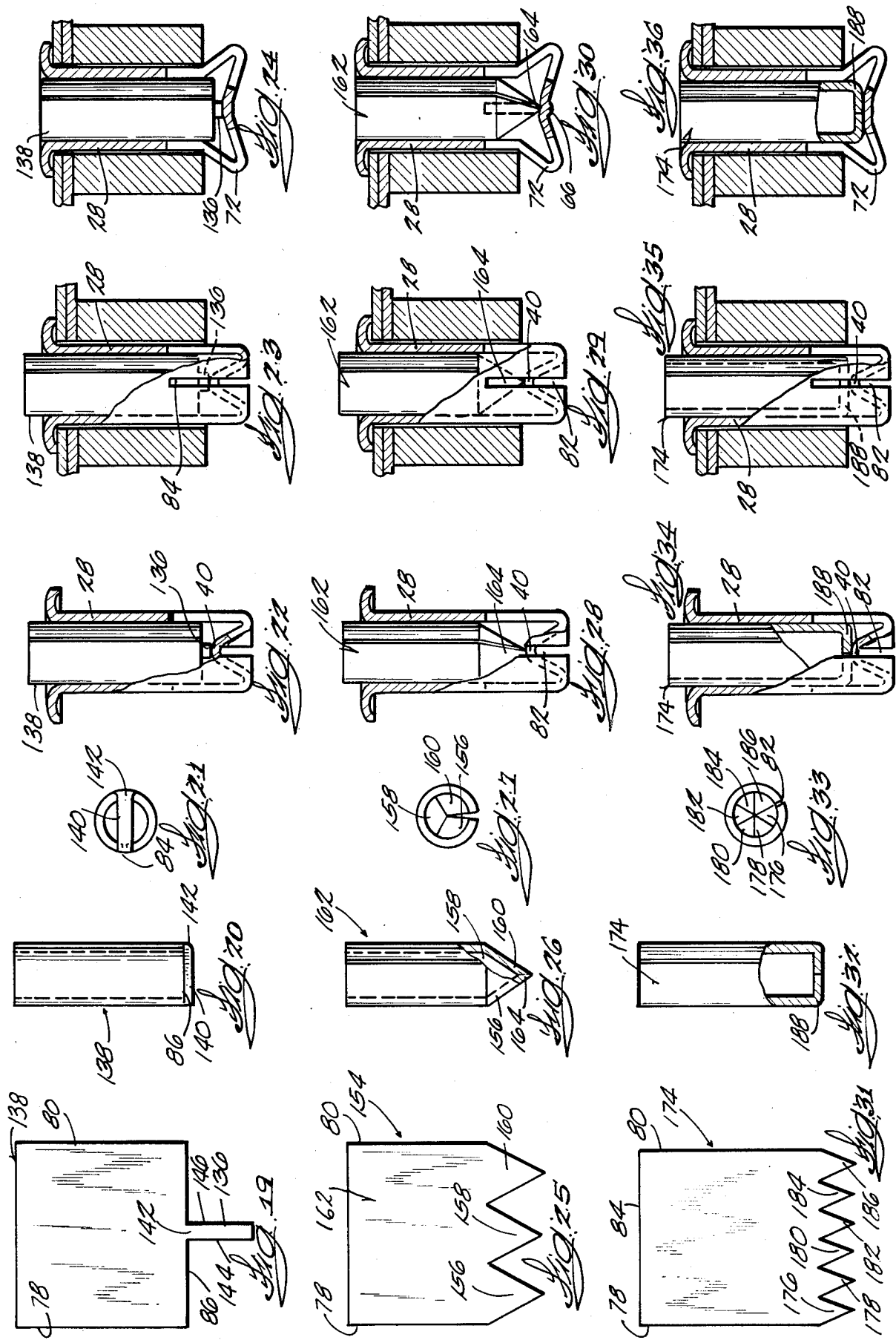

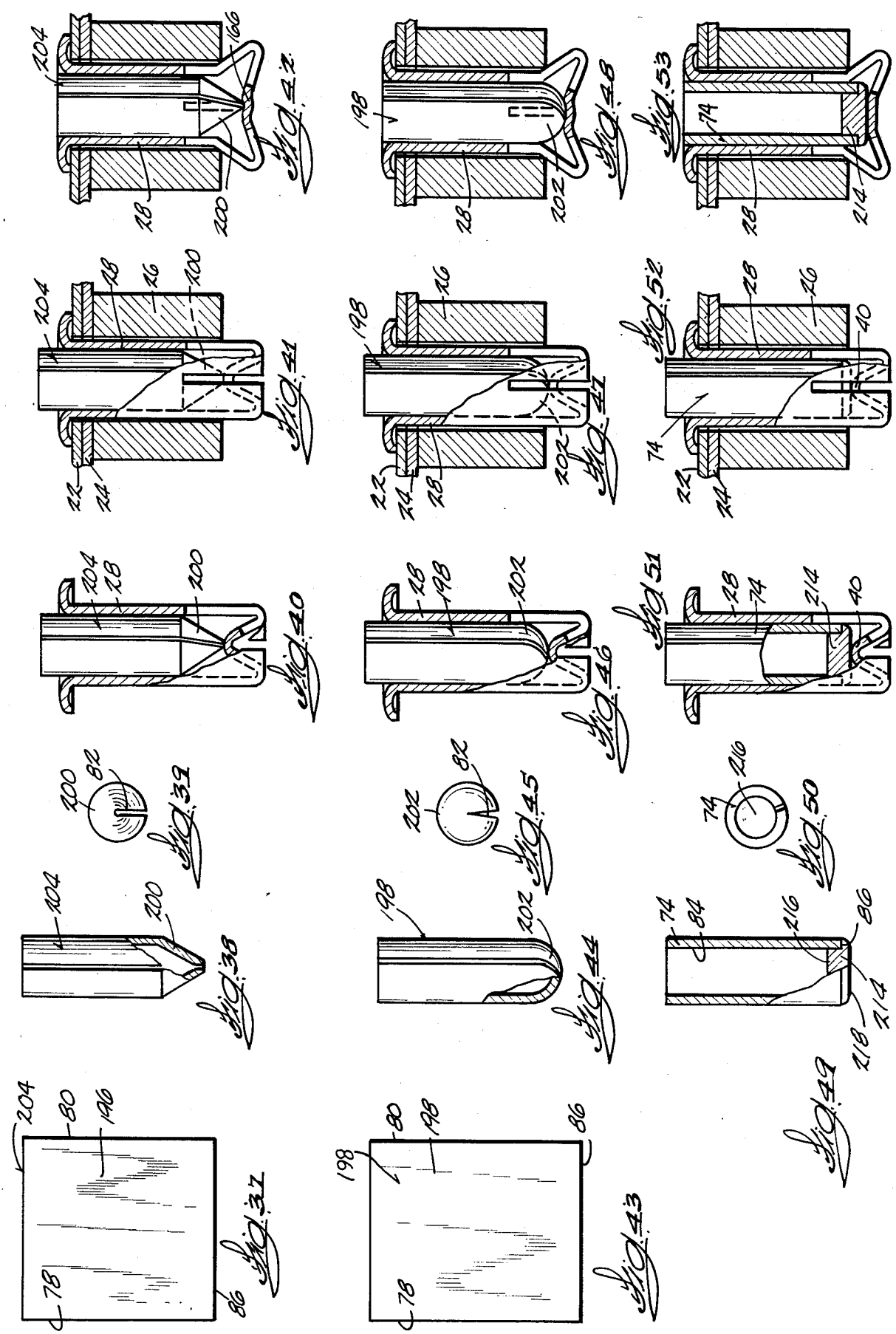

BLIND FASTENER SETTABLE BY SPRING PIN

TECHNICAL FIELD

This invention relates to blind fasteners of the type having a hollow body or shell and a plunger fitting within it which can be driven into the hollow body to radially expand an inner portion of the shell, thereby forming a second head. Such fasteners are especially useful for fastening together assemblies having material thicknesses from less than about 0.030 inches to very large values.

BACKGROUND ART

FIGS. 1-5 show a previously known blind fastener generally indicated at 20, here used to fasten members 22, 24, and 26 together. Fastener 20 comprises a generally tubular outer member 28 and setting means 30. Outer member 28, which is identical to the outer members shown in the other figures and is numbered with the same reference characters, is disposed along an axis 32 and has a first head 34 at one end, a coaxial, generally conical, purposefully radially expandable portion 36 at the other end, and a tubular portion 38 between said ends. Portion 36 has an apex 40 disposed within tubular portion 38. Axial slits such as 42, 44, and 46 extend along tube 38 and portion 36, cutting the region of tube 38 adjacent portion 36 and dividing that region into plural legs. An interior wall 50 within outer member 28 defines an internal passage in tube 38 passing through head 34 and tube 38 for access to the interior side of apex 40.

In the known structure, setting means 30 is a solid cylindrical pin having an outer face 52 that protrudes from head 34 before the fastener is set and an inner face 54 butting against apex 40. Before the fastener is set, as illustrated in FIG. 4, outer wall 56 is cylindrical, permitting the fastener to be inserted in apertures 58, 60, and 62 of workpieces 22, 24, and 26 so that portion 36 protrudes beyond the other side of the last aperture (62). The fastener is then set by driving outer face 52 axially toward apex 40. The inward travel of setting means 30 thus flattens portion 36 axially, forcing legs such as 64, 66, and 68 of outer member 28 radially outward to form a second head 72 having a greater diameter than aperture 62, thereby securing the fastener in place and clamping parts 22,24 and 26 together. The dimensions of setting means 30 and interior wall 50 are such that the fastener should not fall apart, whether before or after setting.

One difficulty with this structure is that the prior art setting means 30 has a limited degree of resilience and thus is frequently subject to loosening, especially in joined structures subject to vibration. If setting means 30 loosens and falls out, the shear resistance of fastener 20 is materially reduced. Another difficulty is the relatively high weight of pin 30 in relation to its shear strength.

Fasteners of the general type described above are also illustrated by the following U.S. patents: 2,398,532, issued to Keehn on Apr. 16, 1946; and 2,948,937, issued to Rapata on Aug. 16, 1960. U.S. Pat. No. 2,562,721, issued to Jakosky on July 31, 1951, shows a fastener having a similar shell, but set by hydraulic pressure. Somewhat less pertinent are the devices shown in U.S. Pat. Nos. 3,350,976, issued to Topf on Nov. 7, 1967; and 3,481,242, issued to the same inventor on Dec. 2, 1969.

French Pat. No. 2,306,782, issued to Raychem Corporation, discloses a settable fastener having a outer tubular piece shown in its FIG. 1C and an inner tubular member shaped much like a spring pin. The inner element is made from an alloy which has a memory, allowing it to undergo a change in shape when the temperature of the assembly is changed. This change allows the inner element to expand, thereby deforming the outer element to form the second head of the fastener. This construction has the disadvantage of requiring the application of heat to the inner member to set the fastener. The fastener shown in that patent apparently cannot be set by driving the inner element into the assembly.

Spring pins per se are also known, but have not been used according to the present invention.

SUMMARY OF THE INVENTION

The present invention includes a generally tubular outer member having a head at one end, a radially expandable portion protruding into the other end, and a passage communicating through the head to the radially expandable portion. Setting means received in the passage is driven inwardly to expand the radially expandable portion, thereby spreading the legs of the fastener radially outward to form a second head which secures the fastener in place.

An important and novel feature of the invention is that the setting means is a generally tubular spring pin having the apex contacting means described below. The spring pin is resiliently expandable for engaging itself within the passage of the tubular outer member. Due to this resilience, the spring pin does not have a tendency to loosen or fall out of the outer member. A tubular spring pin also weighs less, is stronger, and costs no more than solid pins which previously have been used.

In one embodiment, apex contacting means, which can have several different configurations, are disposed between the tubular body of the spring pin and the apex of the outer member so when the spring pin is driven into the member the apex of the radially expandable portion is driven axially. The apex contacting means can alternatively be a separate piece disposed between the spring pin and the radially expandable portion of the assembled fastener; an inwardly swaged end of the spring pin; a segmented flat or pyramidal end of the spring pin formed by axially slitting its working end to define plural leaves which are folded inward; or a tab depending from the working end of the spring pin and folded to bridge its central opening, defining an apex contacting member. Other apex contacting means or direct contact of a tubular end of the spring pin with the apex of the outer member are also contemplated within the scope of the present invention.

BRIEF DESCRIPTION OF DRAWINGS

FIGS. 1 through 5 are respectively a side elevation of the prior art setting pin; a plan view of the setting pin; a cutaway side elevation, partly in section, of a prior art fastener incorporating, the solid pin of FIGS. 1 and 2; an axial section of the fastener of FIG. 3 installed in workpieces to be fastened; and a similar view of the workpieces and fastener after the fastener has been set.

FIG. 6 is a blank for one embodiment of a spring pin as incorported in the present invention, and FIGS. 7-11 correspond respectively to FIGS. 1-5, but show a spring pin and removable setting tool in place of the solid pin shown in FIGS. 1-5.

FIGS. 13-18 correspond to FIGS. 6-11, but show another embodiment of the invention in which the blank for the spring pin includes a depending tab which is folded to bridge the central bore of the pin.

FIGS. 19-24 correspond to FIGS. 13-18 respectively, but show a differently shaped depending tab of the spring pin.

FIGS. 25-30 respectively correspond to FIGS. 19-24, but show the blank and final structure for a spring pin having a pyramidal segmented end for contacting the apex of the outer member.

FIGS. 31-36 correspond respectively to FIG. 25-30, but show a spring pin whose working end is a segmented flat end of the generally cylindrical pin.

FIGS. 37-42 are similar to FIGS. 31-36 respectively, but show a structure in which the spring pin is swaged to form a conical end.

FIGS. 43-48 are similar to FIGS. 37-42 respectively, but show a spring pin with a swaged hemispherical end.

FIGS. 49-53 are similar to FIGS. 44-48 respectively, but show a structure in which a separate part bridges the bore of a conventional spring pin, thereby providing structure to entire apex of the outer portion of the fastener.

FIG. 57 shows an alternate setting tool.

DETAILED DESCRIPTION OF PREFERRED EMBODIMENTS

Figure 56:
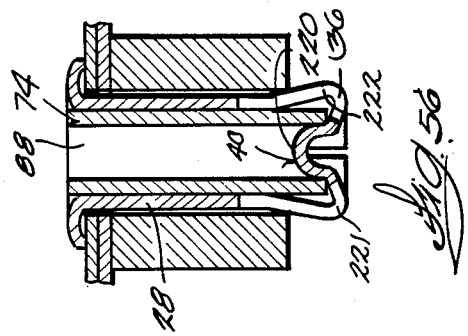
FIGS. 54-56 are similar to FIGS. 9-11 respectively, but show an alternate embodiment in which no setting tool or apex contacting means is needed to enable the fastener to be set by a spring pin.

Although the disclosure hereof is detailed and exact to enable those skilled in the art to practice the invention, the physical embodiments herein disclosed merely exemplify the invention, which may be embodied in other specific structure. While the best known embodiment has been described, the details may be changed without departing from the invention, which is defined by the claims.

FIGS. 6-11 show a first embodiment of the invention, in which the prior art setting means 30—a solid cylindrical pin—is replaced by a spring pin 74 made from a generally rectangular blank 76 by rolling it so its edges 78, 80 face each other and define the edges of an axial slit 82. The edges 84 and 86 of the blank become the first and second ends of spring pin 74. Spring pin 74 is thus substantially cylindrical and includes an axial through bore 88.

Figure 12:
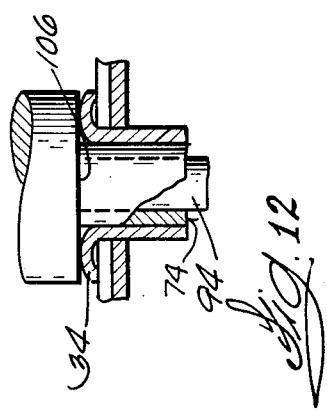
FIG. 12 is a section of a fastener and workpieces as shown in FIGS. 6-11, but including an alternative removable tool for setting the fastner.

In the embodiment of FIGS. 6-11, spring pin 74 is advanced and apex 40 is flattened by a press tool 90 to set the fastener. Referring particularly to FIG. 10, tool 90 comprises a base 92 from which forwardly protrudes an axially disposed pin 94 which is substantially equal in length to spring pin 74. The diameter of pin 94 is such as to provide a slight clearance from the wall of bore 88. Also forwardly protruding from base 92 is an annular skirt 98 having an interior cylindrical wall 100 of sufficient diameter to clear head 34 of fastener 102. FIG. 11 shows that the leading edge 104 of skirt 98 extends forwardly beyond the recessed surface 106 of tool 90. When leading edge 104 abuts the uppermost surface of workpiece 22, spring pin 74 will be urged by surface 106 to its set position. Recessed surface 106 will clear head 34 to prevent damage to the latter and is positioned with respect to surface 104 to determine the depth to which spring pin 74 will be set. In a less preferred embodiment of the invention illustrated in FIG. 12, skirt 98 is eliminated and surface 106 is either stopped by independent means or comes to rest against head 34 to index the travel of spring pin 74 to optimal setting. However, it is necessary to use this structure carefully to avoid squashing the convex flange 34 and losing proper pin position which would loosen the clamping action on the assembly. Tool 90 is withdrawn after the fastener is set, leaving spring pin 74 behind. Installation of the fastener with tool 90 permits optimal expansion of the fastener, as what amounts to a solid pin is urged against apex 40 to flatten the same. However, the withdrawal of the tool provides a lighter weight set fastener which includes a spring pin to provide increased shear resistance and other desirable features disclosed herein.

Turning now to the embodiment of FIGS. 13-18, blank 120, the previously described parts of which are numbered to correspond with FIG. 6, further includes a depending tab 122 joined by its neck 124 to edge 86. Edges 78 and 80 are brought together as previously disclosed to form slit 82, then tab 122 is folded over at neck 124 to form an end wall 126 which axially abuts lower edge 86 of the pin. In this embodiment spring pin 128 is still capable of circumferential expansion and includes integral apex contacting means defined by end wall 126. In the setting tool 90 for this embodiment pin 94 need not be full length but is a shortened locating pin to center the tool in spring pin 128.

Referring to FIGS. 16-18 in particular, spring pin 128 is oriented within outer member 28 so end wall 126 defining apex contacting means abuts apex 40. When the fastener is set in workpieces 22-26, end wall 126 acts on apex 40 to flatten it, forming second head 108 as previously described.

The embodiment of FIGS. 19-24 is very similar to that shown in FIGS. 13-18, except that tab 136 of spring pin 138 is reduced in width to form a bridge 140 supported at one end by neck 142 thereof and at the other end by a portion of edge 86. The distance between edges 144 and 146 of tab 136 should be greater than the width of slit 82, or alternatively bridge 140 should not intersect slit 82, so tab 136 will not be forced into slit 82. FIGS. 22-24 show that spring pin 138 functions substantially as spring pin 128 does.

In the embodiment of FIGS. 25-30, blank 154 has edges 78, 80, and 84 as previously defined and three generally triangular depending tabs 156, 158, and 160. (The exact number of tabs is not critical.) The base to height ratio of the respective tabs in this embodiment is such that when edges 78 and 80 are folded in opposition to form slit 82 the apices of the respective tabs will converge before the tabs are folded perpendicular to the axis of the pin. Consequently, the leading edge of spring pin 162 approximates a pyramid, but has rounded base edges as a result of the round configuration of the remaining portion of the spring pin. The apex 164 of spring pin 162 contacts apex 40 of outer member 28, and when spring pin 162 is driven as shown in FIG. 30 second head 72 is formed. The leading edge of spring pin 162 is very resistant to axial crushing when the spring pin is advanced.

A slightly different embodiment of the invention is shown in FIGS. 31-36. Here, when edges 78 and 80 are folded together to form slit 82, tabs 176-186 of spring pin 74 are folded 90 degrees and their respective side edges converge to form a substantially flat, segmented end wall 188. Wall 188 functions in the assembled fastener, illustrated in FIGS. 34–36, substantially in the same manner as end wall 126 functions in the embodiment shown in FIGS. 13–18.

FIGS. 37–42 and 43–48 respectively show two additional embodiments of the invention in which the apex contacting means is formed by swaging one end of the spring pin, rather than by forming segments which are folded together. Spring pin blanks 196 and 198 are formed into the structures respectively shown at FIGS. 38 and 39, and at FIGS. 44 and 45. The end of each sprrng pin 196, 198 corresponding to its edge 86 is shaped to form the slitted conical end structure 200 or hemispherical end structure 202 shown respectively in FIGS. 38–39 and 44–45. In these embodiments slit 82 runs up end structures 200 and 202 to their respective apices to avoid impairing the circumferential resilience of the spring pins. The structures shown in FIGS. 37–48 function identically to the structure shown in FIGS. 25–30.

Turning to the embodiment of FIGS. 49–53, spring pin 74 is substantially as shown in FIG. 7, although somewhat shorter in a fastener of the same size. The apex contacting means is here a separate part 214 having a stub shaft of smaller disc 216 received within bore 88 locating apex contacting means 214 and an outer, generally disc shaped portion 218 which abuts edge 86 of spring pin 74. Apex contacting means 214 is interposed between spring pin 74 and apex 40 in the assembled fastener, which is installed and set in substantially the same fashion as the embodiment of FIGS. 13–18.

Figure 55:
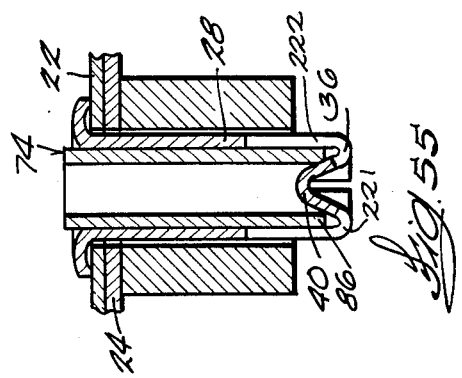
Figure 54:
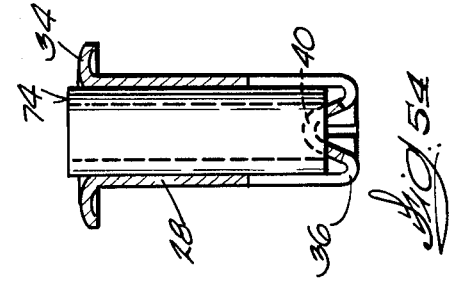
Figure 51:
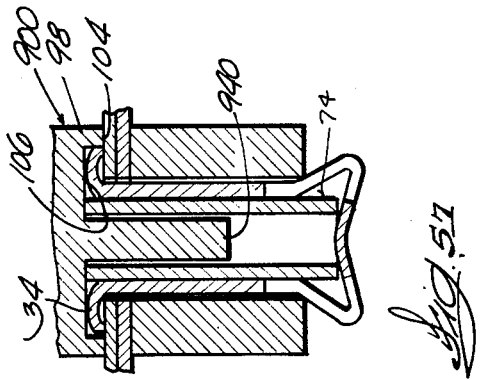

The structure shown in FIGS. 54–56 employs the spring pin shown in FIG. 7 but is shown being set without a setting tool. If so set it is necessary to avoid squashing the convex flange 34 as discussed above. Although no structure is provided at the center of spring pin 74 for contacting apex 40, spring pin 74 has appropriate inside and outside dimensions to radially expand end 36 of the outer member 28. The end of the spring pin comes in contact with the side walls of the cone, and the apex goes up inside of the spring pin using up some of the normal expansion metal in the leg and causing the second head to expand to a smaller degree, and giving less clamping force in the assembly. As FIG. 56 illustrates, the portion of apex 40 disposed within the margin defined by bore 88 is not deformed when the second head 72 is formed, thus providing a roughly hemispherical recess 220 and spreading legs such as 221 and 222 radially outward to a smaller degree. This embodiment avoids the need for apex contacting means to set the fastener. In any embodiment having a spring pin with a bottom fastener setting surface, the setting tool can and should have a short center pin which serves as a locating pin, not a setting pin.

FIG. 57 shows a setting tool 900 similar to tool 90 described at page 7 and FIG. 10. The tool has a base 92 from which pin 940 extends axially, but pin 940 is much shorter than spring pin 74 or any of the spring pins shown, and serves only as a locating pin to align the tool 900. As in tool 90 the diameter of the pin 940 is selected to provide slight clearance in bore 88. An annular skirt 98 is preferably provided having a cylindrical wall 100 of sufficient diameter to clear head 34 of a fastener and a leading edge 104 to be driven to abut the surface of a workpiece 22. The height of wall 100 is selected so that the spring pin is driven to the correct position for optimum fastner setting without damage to head 34.

I claim:

1. In a settable fastener for being set in the aperture of a workpiece, said fastener comprising:
   A. a generally tubular outer member disposed along an axis and having a first head at one end for bearing against a said workpiece, a coaxial, generally conical, radially expandable portion at the other end, and a tubular portion between said ends, said expandable portion having an apex within said tubular portion; at least two axial slits in said shaft and said expandable portion for dividing said other end into plural legs; and an internal passage in said tubular portion communicating with said apex through said head; and
   B. setting means including a generally cylindrical pin received in and frictionally engaging said passage and capable of being driven axially against said apex to flatten said expandable portion, thereby spreading said legs radially outward to form a second head for clamping said workpiece between said first and second heads;
   the improvement wherein said setting means comprises a generally tubular spring pin having first and second ends and a central portion between said ends, said central portion being resiliently circumferentially expandable for engaging said passage.

2. The settable fastener of claim 1, further comprising apex contacting means disposed within said passage for transmitting an axial movement from said spring pin to said apex.

3. The settable fastener of claim 2, wherein said apex contacting means is an integral portion of the second end of said spring pin.

4. The settable fastener of claim 3, wherein said spring pin second end is inwardly deformed to form said apex contacting means.

5. The settable fastener of claim 4, wherein said spring pin second end is divided into plural inwardly folded leaves which form said apex contacting means.

6. The settable fastener of claim 4, wherein said spring pin second end has an inwardly swaged end forming said apex contacting means.

7. The settable fastener of claim 3, wherein said apex contacting means comprises an integral tab extending from and bridging said spring pin second end.

8. The settable fastener of claim 2, wherein said apex contacting means is a separate, generally disc-shaped piece disposed between said spring pin second end and said apex and having a first face butting against said spring pin second end and a second face butting against said apex.

9. The settable fastener of claim 8, further comprising a stub shaft projecting axially from said first face and received in said spring pin second end.

10. A setting tool for a spring pin to drive the spring pin into a headed tubular fastener with expandable legs, comprising an axial pin sized to be a loose fit in a spring pin to be driven, a radial surface at right angles to said pin, and a cylindrical skirt extending axially from said radial surface coaxially to said pin, the diameter of the skirt being at least as large as the fastener head and the height of the skirt being at least as large as the height of the head, the height being selected to permit a spring pin of a selected length to be driven an optimum distance to set said fastener legs.

11. The device of claim 10 wherein the length of said pin is selected to be sufficient to assist in setting said legs.

12. The device of claim 10 wherein the length of said pin is selected to be too short to set said legs but long enough to align said tool in said spring pin.

* * * * *